(12) United States Patent
Mizuno et al.

(10) Patent No.: US 10,978,721 B2
(45) Date of Patent: *Apr. 13, 2021

(54) POLYOLEFIN MICROPOROUS MEMBRANE, BATTERY SEPARATOR AND PRODUCTION METHOD

(71) Applicant: Toray Industries, Inc., Tokyo (JP)

(72) Inventors: Naoki Mizuno, Nasushiobara (JP); Masami Sugata, Nasushiobara (JP)

(73) Assignee: Toray Industries, Inc., Tokyo (JP)

( * ) Notice: Subject to any disclaimer, the term of this patent is extended or adjusted under 35 U.S.C. 154(b) by 238 days.

This patent is subject to a terminal disclaimer.

(21) Appl. No.: 16/065,374

(22) PCT Filed: Nov. 14, 2016

(86) PCT No.: PCT/JP2016/083729
§ 371 (c)(1),
(2) Date: Jun. 22, 2018

(87) PCT Pub. No.: WO2017/110306
PCT Pub. Date: Jun. 29, 2017

(65) Prior Publication Data
US 2019/0190037 A1    Jun. 20, 2019

(30) Foreign Application Priority Data

Dec. 24, 2015  (JP) .............................. JP2015-252453

(51) Int. Cl.
*H01M 50/40* (2021.01)
*B32B 5/32* (2006.01)
(Continued)

(52) U.S. Cl.
CPC ....... *H01M 8/0239* (2013.01); *B29C 48/0018* (2019.02); *B29C 55/143* (2013.01);
(Continued)

(58) Field of Classification Search
None
See application file for complete search history.

(56) References Cited

U.S. PATENT DOCUMENTS

2003/0003363 A1  1/2003  Daido et al.
2009/0250838 A1* 10/2009  Sano ..................... H01M 2/145
                                              264/291
(Continued)

FOREIGN PATENT DOCUMENTS

CN        104900832 A     9/2015
JP        2009-249480 A  10/2009
(Continued)

OTHER PUBLICATIONS

Korean Office Action dated Aug. 21, 2019, of counterpart Korean Application No. 10-2018-7016796, along with an English translation.

(Continued)

*Primary Examiner* — Jonathan Crepeau
*Assistant Examiner* — Angela J Martin
(74) *Attorney, Agent, or Firm* — DLA Piper LLP (US)

(57) ABSTRACT

A battery separator includes a polyolefin microporous membrane and a porous layer placed on at least one surface of the polyolefin microporous membrane. The polyolefin microporous membrane has a variation range of an F25 value in a longitudinal direction of 1 MPa or less. The F25 value indicates a value obtained by dividing a load value measured at 25% elongation of a specimen with use of a tensile tester by a cross-sectional area of the specimen. The porous layer contains a fluorine-based resin and an inorganic particle and has an average thickness T(ave) of 1 to 5 μm.

10 Claims, 3 Drawing Sheets

(51) Int. Cl.

| | | |
|---|---|---|
| *C08J 9/28* | (2006.01) | |
| *C09D 127/16* | (2006.01) | |
| *H01M 50/409* | (2021.01) | |
| *B29C 55/14* | (2006.01) | |
| *H01M 50/403* | (2021.01) | |
| *B29C 48/00* | (2019.01) | |
| *H01M 50/446* | (2021.01) | |
| *H01M 50/411* | (2021.01) | |
| *H01M 50/449* | (2021.01) | |
| *H01M 8/0239* | (2016.01) | |
| *C08L 23/06* | (2006.01) | |
| *C08L 27/16* | (2006.01) | |
| *C08L 27/20* | (2006.01) | |
| *H01M 10/0525* | (2010.01) | |

(52) U.S. Cl.
CPC ........ *B32B 5/32* (2013.01); *C08J 9/28* (2013.01); *C08L 23/06* (2013.01); *C08L 27/16* (2013.01); *C08L 27/20* (2013.01); *C09D 127/16* (2013.01); *H01M 50/403* (2021.01); *H01M 50/409* (2021.01); *H01M 50/411* (2021.01); *H01M 50/446* (2021.01); *H01M 50/449* (2021.01); *C08L 2203/20* (2013.01); *H01M 10/0525* (2013.01)

(56) References Cited

U.S. PATENT DOCUMENTS

| | | | |
|---|---|---|---|
| 2010/0119932 A1* | 5/2010 | Nakura | ............ H01M 10/0525 429/163 |
| 2013/0095365 A1 | 4/2013 | Nishikawa | |
| 2013/0116355 A1* | 5/2013 | Kang | ....................... C08K 3/26 521/143 |
| 2014/0349193 A1 | 11/2014 | Kang et al. | |
| 2014/0361457 A1 | 12/2014 | Nogata | |
| 2014/0377687 A1 | 12/2014 | Miyake et al. | |
| 2015/0202647 A1 | 7/2015 | Watanabe et al. | |
| 2017/0274329 A1* | 9/2017 | Mizuno | ....................... C08J 9/28 |
| 2017/0317328 A1* | 11/2017 | Mizuno | ....................... C08J 9/28 |

FOREIGN PATENT DOCUMENTS

| | | | | |
|---|---|---|---|---|
| JP | 2012-500130 A | | 1/2012 | |
| JP | 4988973 B1 | | 8/2012 | |
| JP | 2013-142101 A | | 7/2013 | |
| JP | 2013-530261 A | | 7/2013 | |
| JP | 5226744 B2 | | 7/2013 | |
| JP | 2016-143640 A | | 8/2016 | |
| KR | 10-2012-0121152 A | | 11/2012 | |
| KR | 101307384 | * | 9/2013 | ............. H01M 2/14 |
| KR | 10-1336593 B1 | | 12/2013 | |
| KR | 10-2015-0091973 A | | 8/2015 | |
| TW | 201338240 A | | 9/2013 | |
| WO | 2010/018749 A1 | | 2/2010 | |
| WO | 2013/080701 A1 | | 6/2013 | |
| WO | 2014/025004 A1 | | 2/2014 | |
| WO | 2016/080200 A1 | | 5/2016 | |
| WO | WO 2016080200 | * | 5/2016 | ............. B32B 27/32 |
| WO | 2016/092993 A1 | | 6/2016 | |
| WO | WO 2016092993 | * | 6/2016 | ............. B32B 27/32 |

OTHER PUBLICATIONS

Office Action dated Jun. 3, 2020, of counterpart Chinese Application No. 201680074097.8, along with an English translation.

* cited by examiner

POLYOLEFIN MICROPOROUS MEMBRANE, BATTERY SEPARATOR AND PRODUCTION METHOD

TECHNICAL FIELD

This disclosure is directed to a battery separator including a porous layer having electrode adhesion and a polyolefin microporous membrane, and a battery separator having a high winding density when a roll is formed and suitable for a lithium ion secondary battery having a high volume energy density.

BACKGROUND

A thermoplastic resin microporous membrane is widely used as a membrane for separation, a membrane for selective permeation, a membrane for isolation and the like. Examples thereof include, for example, a battery separator to be used in lithium ion secondary battery, nickel-hydrogen battery, nickel-cadmium battery or polymer battery; a separator for electric double layer capacitors; various filters such as reverse osmosis filtration membrane, ultrafiltration membrane and microfiltration membrane; a moisture-permeable waterproof clothing; a medical material and the like.

In particular, a polyethylene-made microporous membrane is suitably used as a lithium ion secondary battery separator, the polyethylene-made microporous membrane ensuring ion permeability due to impregnation with an electrolytic solution, excellent electrical insulating properties, and a pore blocking function of avoiding an excessive temperature rise by cutting off a current at a temperature of approximately from 120 to 150° C. when the temperature in a battery shows an abnormal rise.

Furthermore, the lithium ion battery separator greatly affects battery properties, battery productivity and battery safety, and requires heat resistance, electrode adhesion, permeability, melt rupture property (meltdown property) and the like. It has hitherto been studied to impart heat resistance and adhesiveness to a battery separator, for example, by providing a porous layer on a polyolefin microporous membrane. As resins used for the porous layer, polyamideimide resins, polyimide resins and polyamide resins having good heat resistance, and fluorine-based resins having good adhesiveness are suitably used. In addition, in recent years, a water-soluble or water-dispersible binder that can be used for lamination of the porous layer in a relatively easy step has also been used. Herein, the porous layer is a layer obtained by a wet coating process.

In Example 1 of Japanese Patent No. 4988973, both surfaces of a polyethylene microporous membrane is coated with a coating solution prepared by dissolving a polyvinylidene fluoride-hexafluoropropylene copolymer in a mixed solvent of dimethylacetamide/tripropylene glycol, followed by placement in a coagulation bath, and subjecting to water washing and drying, thereby obtaining a non-aqueous secondary battery separator.

In Example 1 of Japanese Patent No. 5226744, a coating solution prepared by dissolving VdF/HFP/CTFE in a mixed solvent of DMAc/TPG is placed in a tank in which two Meyer bars have been arranged in parallel at the bottom thereof, and a polypropylene microporous membrane transported from the upper part of the tank into the tank at a transport rate of 3 m/min to pass through the two Mayer bars to coat the both surfaces with a coating solution, followed by placing it in a coagulation tank, and subjecting to water washing and drying, thereby obtaining a composite porous membrane.

In recent years, lithium ion secondary batteries have been studied for a wide variety of uses such as lawn mowers, weed whackers and small boats, in addition to electric vehicles, hybrid vehicles and electric bicycles. With the spread of such uses, lithium ion secondary batteries are demanded to increase in capacity and decrease in cost. Accordingly, to reduce production cost, it is expected that an increase in length of battery separators to as long as 1000 m or more will advance more and more in the future. By the increase in length of the separators, the switching time of battery separator rolls is reduced during a slitting step or a battery assembling step, and the battery separators to decrease material loss can be obtained.

On the other hand, when a porous layer is placed on a polyolefin microporous membrane having increased length by wet coating to produce a battery separator, when the variation in thickness of the porous layer is large in a longitudinal direction (particularly, when partially thin portions are formed in the porous layer), the average thickness is required to be 1.5 to 2 times the necessary minimum thickness to sufficiently ensure functionality of the porous layer. This results in a factor for cost increase. In addition, the thicker separator decreases the number of turns in an electrode roll, which also results in a factor hindering an increase in capacity of the battery.

Furthermore, the increase in length of the battery separator exerts an adverse influence on a winding appearance of the roll such as easy occurrence of winding displacement due to an increase in diameter when the roll is formed. This tendency tends to be remarkable as the number of turns of the roll increases, and it is expected that the number of turns of the roll increase further by a decrease in thickness of the separator.

It could therefore be helpful to provide a battery separator suitable for realizing higher capacity of a battery, in which a porous layer having a uniform thickness is placed on the above-mentioned polyolefin microporous membrane. The porous layer having a uniform thickness means a porous layer having a variation range (R) of the thickness in a longitudinal direction of 1.0 μm or less.

SUMMARY

We thus provide:

(1) A battery separator, comprising a polyolefin microporous membrane and a porous layer placed on at least one surface of the polyolefin microporous membrane, wherein the polyolefin microporous membrane has a variation range of an F25 value in a longitudinal direction of 1 MPa or less (wherein the F25 value indicates a value obtained by dividing a load value measured at 25% elongation of a specimen with use of a tensile tester by a cross-sectional area of the specimen), and the porous layer contains a fluorine-based resin and an inorganic particle and has an average thickness T(ave) of 1 to 5 μm.

(2) It is preferred that the porous layer has a thickness variation range (R) in a longitudinal direction of 1.0 μm or less.

(3) It is preferred that the fluorine-based resin contains at least one member selected from a polyvinylidene fluoride and a polyvinylidene fluoride-hexafluoropropylene copolymer.

(4) It is preferred that a length of the battery separator is 2000 m or more.

(5) It is preferred that a length of the battery separator is 3000 m or more.

(6) A method of producing a battery separator, comprising:

(a) a step of melt-kneading a polyolefin resin and a forming solvent, thereby preparing a polyolefin resin solution;

(b) a step of extruding the polyolefin resin solution in a sheet shape from an extruder and cooling an extrudate thereof, thereby forming an unstretched gel-like sheet;

(c) a step of passing the unstretched gel-like sheet between at least three pairs of longitudinal stretching roller groups and stretching it in a longitudinal direction based on stepwise increase of peripheral speeds of the roller groups, thereby forming a longitudinally stretched gel-like sheet (wherein a longitudinal stretching roller and a nip roller which has been covered with a heat resistant rubber and parallelly contacts therewith are designated as a pair of longitudinal stretching roller group, and a contact pressure of the nip roller to the longitudinal stretching roller is 0.05 MPa or more and 0.5 MPa or less);

(d) a step of stretching the longitudinally stretched gel-like sheet in a transverse direction while holding it to allow a clip-to-clip distance to be 50 mm or less at a tenter outlet, thereby obtaining a biaxially stretched gel-like sheet;

(e) a step of extracting the forming solvent from the biaxially stretched gel-like sheet and drying it;

(f) a step of heat-treating the dried sheet, thereby obtaining a polyolefin microporous membrane; and (g) a step of coating at least one surface of the polyolefin microporous membrane with a coating solution containing a fluorine-based resin and an inorganic particle by a roll coating method using a coating roller having a deflection accuracy of 10 µm/φ100 mm or less, followed by drying.

(7) The method in which a peripheral speed ratio of the longitudinal stretching rollers adjacent to each other in the step (c) increases stepwise.

(8) The method in which the coating roller is a gravure roller.

(9) A method of producing a battery separator roll, the method comprising a step of winding the battery separator according to any one of the above (1) to (5) or a battery separator obtained by the method for producing a battery separator according to the above (6) or (7) on a winding core at a transport rate of 50 m/min or more.

A polyolefin microporous membrane and the following battery separator are obtained: the battery separator in which a porous layer containing a fluorine-based resin and an inorganic particle and having a uniform thickness is placed on at least one surface of the polyolefin microporous membrane, and which is windable with a high density and suitable for realizing higher capacity of a battery having excellent electrode adhesion.

DESCRIPTION OF REFERENCE NUMERALS AND SIGNS

Figure 1:
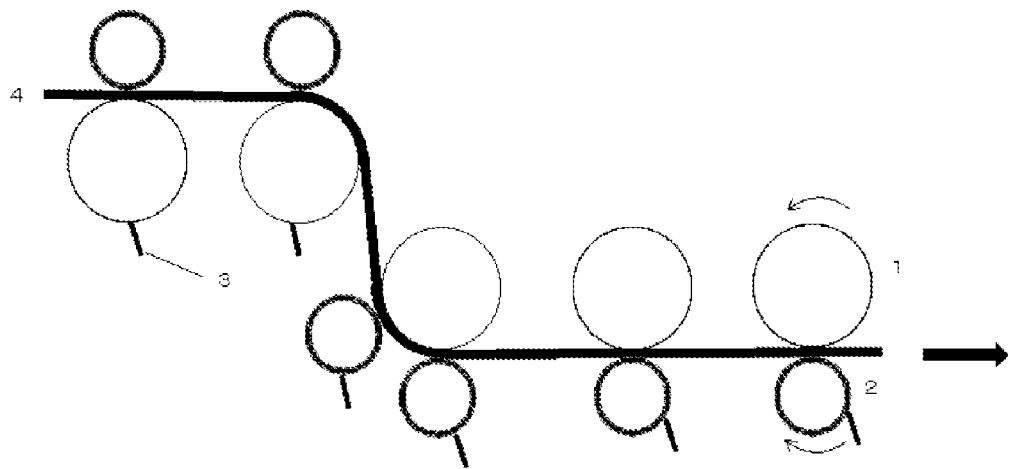
FIG. 1 is a schematic diagram illustrating a longitudinal stretching device A used for sequential biaxial stretching.

1. Longitudinal stretching roller
2. Nip roller
3. Blade
4. Gel-like sheet
5. Biaxially stretched sheet
6. Longitudinal re-stretching roller
7. Nip roller for re-stretching
8. Polyolefin microporous membrane
9. Coating roller
10. Coating contact line
11. Backing roller
12. Direction of roller position adjustment

DETAILED DESCRIPTION

The polyolefin microporous membrane has a length of 1000 m or more and a variation range of an F25 value in a longitudinal direction of 1 MPa or less (wherein the F25 value indicates a value obtained by dividing a load value measured at 25% elongation of a specimen using a tensile tester by a cross-sectional area of the specimen).

By setting the variation range of the F25 value in the longitudinal direction of the polyolefin microporous membrane to 1 MPa or less, a contact pressure at a contact line between the polyolefin microporous membrane and a coating roller (hereinafter abbreviated as a coating contact line) easily becomes uniform in the longitudinal direction of the polyolefin microporous membrane, thereby achieving an excellent effect of easily making a coating thickness uniform. When the variation range of the F25 value in the longitudinal direction exceeds 1 MPa, variation in winding hardness of a roll of the microporous membrane occurs during winding in a slitting step or a coating step to cause easy occurrence of deflection or winding displacement, resulting in a deteriorated winding appearance. For example, when processing is performed at such a high speed that the transport rate reaches 50 m/min or more during winding on a winding core, this becomes remarkable.

1. Polyolefin Microporous Membrane

First, the polyolefin microporous membrane is described.

The polyolefin microporous membrane has a variation range of the F25 value in the longitudinal direction of 1 MPa or less, preferably 0.8 MPa or less, more preferably 0.6 MPa or less, and still more preferably 0.4 MPa or less. As described below, particularly by highly controlling a longitudinal stretching step and a transverse stretching step, the variation range of the F25 value in the longitudinal direction of a polyethylene microporous membrane can be controlled.

Polyethylene or polypropylene is preferred as a polyolefin resin that configures the polyolefin microporous membrane. The polyolefin resin may be a single component or a mixture of two or more kinds of different polyolefin resins, and examples thereof include a mixture of polyethylene and polypropylene and a copolymer of different olefins. Among these, polyethylene is particularly preferred from the viewpoint of good pore blocking performance. Further, from the viewpoint of pore blocking performance, the melting point (softening point) of polyethylene is preferably 70 to 150° C.

In the following, detailed description is made for the aspect where polyethylene is used as the polyolefin resin. Examples of the polyethylene include a ultrahigh-molecularweight polyethylene, a high-density polyethylene, a medium-density polyethylene, a low-density polyethylene and the like. The polymerization catalyst is not particularly limited, and a Ziegler-Natta catalyst, a Phillips catalyst, a metallocene catalyst or the like may be used. Such a polyethylene may not only be a homopolymer of ethylene but also be a copolymer containing a small amount of other α-olefin. As the α-olefin other than ethylene, suitable examples thereof include propylene, 1-butene, 1-pentene, 1-hexene, 4-methyl-1-pentene, 1-octene, (meth)acrylic acid, (meth)acrylic acid ester, styrene and the like. The polyethylene may be a single polyethylene but is preferably a polyethylene mixture composed of two or more polyethylenes.

As the polyethylene mixture, a mixture of two or more kinds of ultrahigh-molecular-weight polyethylenes differing in the weight average molecular weight (Mw), a mixture of two or more kinds of high-density polyethylenes differing in the weight average molecular weight (Mw), a mixture of two or more kinds of medium-density polyethylenes differing in the weight average molecular weight (Mw), or a mixture of two or more kinds of low-density polyethylenes differing in the weight average molecular weight (Mw) may be used, or a mixture of two or more kinds of polyethylenes selected from the group consisting of an ultrahigh-molecular-weight polyethylene, a high-density polyethylene, a medium-density polyethylene and a low-density polyethylene may be used. The polyethylene mixture is preferably a mixture of an ultrahigh-molecular-weight polyethylene having an Mw of $5 \times 10^5$ or more and a polyethylene having an Mw of $1 \times 10^4$ or more and less than $5 \times 10^5$. The content of the ultrahigh-molecular-weight polyethylene in the mixture is preferably 1 to 40 wt % from the standpoint of tensile strength. The molecular weight distribution (weight average molecular weight (Mw)/number average molecular weight (Mn)) of the polyethylene is preferably 5 to 200 from the standpoint of mechanical strength.

2. Production Method of Polyethylene Microporous Membrane

Next, the method of producing the polyethylene microporous membrane is described.

As the method of producing the polyethylene microporous membrane, examples thereof include a dry process (a method of forming micropores by not using a forming solvent but using a crystal nucleating agent or a particle (also called a stretching pore-opening method) and a wet process (phase separation method), and from the standpoint of homogenization of micropores and planarity, the wet process is preferred.

Examples of the production method by a wet process include, for example, a method where a polyethylene and a forming solvent are heated and melt-kneaded, the obtained resin solution is extruded through a die and cooled to form an unstretched gel-like sheet, and the resulting unstretched gel-like sheet is stretched in at least one axis direction and after removing the forming solvent, the stretched sheet is dried to obtain a microporous membrane.

An unstretched gel-like sheet is stretched in the following two directions: a longitudinal direction (also referred to as "MD (machine direction)"); and a width direction (also referred to as "TD (transverse direction"), at predetermined ratios by a roller method, a tenter method or a combination of these methods. A sequential biaxial stretching method in which stretching is sequentially performed in the longitudinal direction and in the transverse direction is preferred. A simultaneous biaxial stretching method is a stretching method in which the unstretched gel-like sheet is fixed by clips for holding both ends of the sheet and then stretched by expanding the clips apart from each other simultaneously in the longitudinal direction and in the transverse direction. In such a simultaneous biaxial stretching method, the clip-to-clip distance increases in association with the stretch ratio, resulting in the variation in sheet quality in the longitudinal direction. As a result, the variation range of the F25 value in the longitudinal direction increases, and this is therefore unfavorable.

The polyethylene microporous membrane may be a monolayer membrane or a layer configuration including two or more layers differing in molecular weights of or average micropore sizes of the polyolefin. In the layer configuration including two or more layers, it is preferred that the polyethylene resin in at least one outermost layer satisfies the above-mentioned molecular weight and molecular weight distribution of the polyolefin.

As methods of producing a multi-layer polyethylene microporous membrane including two or more layers, examples thereof include, for example, a method in which respective polyethylenes that configure a layer a and a layer b are melt-kneaded with a forming solvent by heating, and respective resin solutions obtained are fed from respective extruders to a die and integrated to perform co-extrusion, and a method in which respective gel-like sheets configuring the respective layers are laminated and thermally fused with each other. The multi-layer microporous membrane can be prepared by either of these methods. The co-extrusion method is preferred, because interlayer adhesive strength is easily achieved, communication holes are easily formed between layers, and therefore, high permeability is easily maintained, and productivity is excellent.

In the following, each step is described using, as an example, when polyethylene resin is used as the polyolefin resin.

(a) Preparation Step of Polyethylene Resin Solution

First, a forming solvent is added to a polyethylene resin, and the mixture is then melt-kneaded to prepare a polyolefin resin solution. As the melt-kneading method, a method using a twin-screw extruder described, for example, in JP-B-H06-104736 and Japanese Patent No. 3347835 can be used. Since the melt-kneading method is publicly known, description thereof is omitted.

The forming solvent is not particularly limited as long as it can dissolve the polyethylene sufficiently. Examples thereof include an aliphatic or cyclic hydrocarbon such as nonane, decane, undecane, dodecane and liquid paraffin, and a mineral oil fraction of which boiling point corresponds to the hydrocarbon above, and a non-volatile solvent such as liquid paraffin is preferred.

The polyethylene resin concentration in the polyethylene resin solution is preferably 25 to 40 parts by weight per 100 parts by weight of a total of the polyethylene resin and the forming solvent. When the polyethylene resin concentration falls within the preferable range above, swelling or neck-in at the die outlet can be prevented during the extrusion of the polyethylene resin solution, and the formability and self-supporting property of the gel-like sheet are maintained.

(b) Step of Forming Unstretched Gel-Like Sheet

Subsequently, the polyethylene resin solution is fed to a die from the extruder directly or via another extruder, extruded in a sheet shape, and cooled to form an unstretched gel-like sheet. A plurality of polyolefin solutions having the same or different compositions may also be fed to one die from the extruder, laminated in layers there and extruded in a sheet shape.

The extrusion method may be either a flat die method or an inflation method. The extrusion temperature is preferably 140 to 250° C., and the extrusion rate is preferably 0.2 to 15 m/min. The thickness can be adjusted by adjusting the extrusion amount of each of the polyolefin solutions. As for the extrusion method, a method disclosed, for example, in JP-B-H06-104736 and Japanese Patent No. 3347835 can be utilized.

A gel-like sheet is formed by cooling the polyethylene resin solution extruded in a sheet shape. As the cooling method, for example, a method of bringing the extrudate into contact with a cooling medium such as cold air and cooling water, or a method of bringing the extrudate into contact with a cooling roller can be used, and it is preferable to cool the extrudate by bringing it into contact with a roller cooled by a cooling medium. For example, the polyethylene resin solution extruded in a sheet shape is brought into contact with a rotating cooling roller set at a surface temperature of 20 to 40° C. by a cooling medium, and an unstretched gel-like sheet can thereby be formed. The extruded polyethylene resin solution is preferably cooled to 25° C. or less.

(c) Longitudinal Stretching Step

The unstretched gel-like sheet is passed through a plurality of pre-heat rollers to increase the temperature to a predetermined temperature, thereafter passed through at least three pairs of longitudinal stretching roller groups in which the peripheral speed between the respective rollers increases stepwise, and stretched in the longitudinal direction to obtain a longitudinally stretched gel-like sheet.

To control the F25 value in the longitudinal direction, it is important to avoid sheet slip in longitudinal stretching to perform uniform longitudinal stretching.

A longitudinal stretching roller and a nip roller parallelly contacting with the longitudinal stretching roller at a constant pressure are designated as a pair of longitudinal stretching roller group. The gel-like sheet passes through each roller group, thereby allowing the sheet to closely contact on the longitudinal stretching roller, and a stretching position of the sheet is fixed, thereby allowing the sheet to stably travel. Thus, uniform longitudinal stretching can be performed. In addition, to perform uniform longitudinal stretching, the longitudinal stretching step is preferably performed at a desired stretch ratio by two or more-stage stretching rather than single-stage stretching. That is, it is important to arrange three or more longitudinal stretching rollers.

It is important to stretch the unstretched gel-like sheet in the longitudinal direction by the stepwise increase of the peripheral speed between the respective stretching rollers. Further, it is preferred to satisfy the stepwise increase of the peripheral speed ratio of the stretching rollers adjacent to each other. That is, while controlling the variation range of the F25 value in the longitudinal direction by stepwise increase of the peripheral speed ratio of the first longitudinal stretching roller and the second longitudinal stretching roller, the peripheral speed ratio of the second longitudinal stretching roller and the third longitudinal stretching roller, and the peripheral speed ratio of the third longitudinal stretching roller and the fourth longitudinal stretching roller, productivity can be satisfied. This is because an effect of squeezing the forming solvent is easily obtained by the stepwise increase of the peripheral speed between the respective stretching rollers, and the slip in the longitudinal stretching step can be prevented, although the unstretched gel-like sheet contains a large amount of the forming solvent and therefore easily slips when it passes on the first longitudinal stretching roller. The squeezing effect as used herein means that slip on the longitudinal stretching roller is avoided by squeezing the forming solvent from the gel-like sheet to achieve stable stretching possible.

As the upper limit of the peripheral speed ratio of the stretching rollers in the first longitudinal stretching step, it is preferably 1.5 or less, more preferably 1.3 or less, and still more preferably 1.2 or less. The lower limit thereof is preferably 1.1. In addition, the difference in the peripheral speed ratio of the respective stretching rollers adjacent to each other is preferably 0.5 or less, more preferably 0.4 or less, and still more preferably 0.3 or less.

The stretching rollers adjacent to each other are preferably arranged at such an interval that the distance from departure of the gel-like sheet from the stretching roller to contact thereof with the next stretching roller is 150 mm to 500 mm. When the above-mentioned distance is less than 150 mm, the variation range of the F25 value sometimes increases, and when it exceeds 500 mm, the temperature of the gel-like sheet is decreased during stretching, sometimes resulting in the occurrence of uneven stretching.

The temperature of the gel-like sheet in the longitudinal stretching step is preferably equal to or less than the "melting point of the polyolefin resin+10° C.". In addition, the stretch ratio is preferably 9 times or more by area ratio, and more preferably 16 to 400 times, from the viewpoint of elasticity and strength of the polyolefin microporous membrane.

For the surface temperature of the longitudinal stretching roller, the variation range of the surface temperature is controlled within ±2° C. in the effective width (sheet passing width during stretching) of the stretching roller for each roller. The surface temperature of the longitudinal stretching roller can be measured, for example, by an infrared radiation thermometer.

The longitudinal stretching roller is preferably a metal roller plated with hard chromium and having a surface roughness of 0.3 S to 5.0 S. When the surface roughness falls within this range, heat conduction is good and sheet slip can be effectively avoided by a synergistic effect with the nip roller.

The slip of the gel-like sheet in the longitudinal stretching step is avoided by using the nip roller. The effect of avoiding the slip cannot be sufficiently obtained only by increasing the contact area between the longitudinal stretching roller and the gel-like sheet without using the nip roller, and the variation range of the F25 value may be increased. In addition, when the sheet slip is tried to be avoided only by use of one nip roller, it is necessary to increase a pressure of the nip roller in contact with the stretching roller (also referred to as a nip pressure), which may collapse the micropores of the polyethylene microporous membrane to be obtained. It is therefore important to use three or more nip rollers, thereby relatively reducing the nip pressure. A plurality of nip rollers may be used for one longitudinal stretching roller.

The nip pressure of each nip roller is 0.05 MPa or more and 0.5 MPa or less. If the nip pressure of the nip roller exceeds 0.5 MPa, micropores in the obtained polyethylene microporous membrane may collapse. If the nip pressure is less than 0.05 MPa, due to an insufficient nip pressure, the effect of avoiding the slip is not obtained and in addition, an effect of squeezing the forming solvent is also less likely to be obtained. The lower limit of the nip pressure of the nip roller is preferably 0.1 MPa, more preferably 0.2 MPa, and the upper limit is preferably 0.5 MPa, more preferably 0.4 MPa.

In addition, the nip roller needs to be covered with a heat-resistant rubber. During the longitudinal stretching step, the forming solvent may bleed out from the gel-like sheet due to heat or pressure by tension, and in particular, the bleeding out is prominently found in the longitudinal stretching immediately after extrusion. Consequently, the sheet is transported or stretched while allowing the bled-out forming solvent to be present at the interface between the sheet and the roller surface, and the sheet is put in a slippery state. When a nip roller covered with a heat-resistant rubber is arranged to parallelly come into contact with the longitudinal stretching roller and the unstretched gel-like sheet is passed therethrough, stretching can be performed while squeezing out the forming solvent from the gel-like sheet under stretching, and slip can be thereby avoided.

The nip roller is preferably a roller in which a metal roller having a diameter of 100 to 300 mm is coated with heat-resistant rubber having a thickness of 3 to 20 mm. A so-called rubber roller in which the volume of a heat-resistant rubber portion occupies 80% or more is easily deformed and hard to impart a uniform pressure to the width direction. This is therefore unfavorable.

In the longitudinal stretching step, when a method of removing the forming solvent attached to the longitudinal stretching roller and the nip roller (sometimes referred to as "scraping means") is used in combination, the effect of avoiding the slip is more efficiently obtained. The scraping means is not particularly limited, but a doctor blade, blowing with the compressed air, suction, or a combination thereof may be used. In particular, the method of scraping off the forming solvent by means of a doctor blade is relatively easily conducted, and therefore, the method is preferred. A method where a doctor blade is abutted on the longitudinal stretching roller to run in parallel to the width direction of the longitudinal stretching roller and the forming solvent is scraped off to the extent that the forming solvent cannot be visually recognized on the stretching roller surface in the period from immediately after passing through the doctor blade until contact by the gel-like sheet under stretching, is preferred. As to the doctor blade, one sheet may be used, or a plurality of sheets may be used. The scraping means may be disposed on either the longitudinal stretching roller or the nip roller or may be disposed on both.

The material of the doctor blade is not particularly limited as long as the material has resistance to a forming solvent, and a resin-made or rubber-made doctor blade is more preferred than a metal-made doctor blade. In a metal-made doctor blade, the stretching roller may be damaged. Examples of the resin-made doctor blade include a polyester-made doctor blade, a polyacetal-made doctor blade, a polyethylene-made doctor blade and the like.

(d) Transverse Stretching Step

The transverse direction stretching step is described.

As the transverse stretching step, both ends of the longitudinally stretched gel-like sheet are fixed by using clips, and then, the longitudinally stretched gel-like sheet is stretched in the transverse direction by expanding the clips apart from each other in the transverse direction in a tenter to obtain a biaxially stretched gel-like sheet. Here, the clip-to-clip distance in a sheet advancing direction is preferably maintained at 50 mm or less from an inlet of the tenter to an outlet thereof, more preferably at 25 mm or less, and still more preferably at 10 mm or less. When the clip-to-clip distance falls within the preferred range described above, the variation range of the F25 value in the width direction can be reduced.

In the transverse stretching step or heat treatment step, to reduce the effect of abrupt temperature change, it is preferable to divide the inside of the tenter into 10 to 30 zones and control the temperature of each zone independently. In particular, in the zone set at a highest temperature of the heat treatment step, to not cause an abrupt temperature change between respective zones in the heat treatment step, the temperature of each zone is preferably raised with hot air in a stepwise manner in the sheet traveling direction.

(e) Step of Removing Forming Solvent from Biaxially Stretched Gel-Like Sheet and Drying the Sheet The forming solvent is removed (washed) from the biaxially stretched gel-like sheet by using a washing solvent. As the washing solvent, a highly volatile solvent may be used and examples thereof include, for example, a hydrocarbon such as pentane, hexane and heptane, a chlorinated hydrocarbon such as methylene chloride and carbon tetrachloride, a fluorocarbon such as trifluoroethane, and ethers such as diethyl ether and dioxane. These washing solvents are appropriately selected depending on the forming solvent and are used individually or as a mixture. As for the washing method, examples thereof include a method of performing extraction by immersion in the washing solvent, a method of showering the washing solvent, a method of suctioning the washing solvent from the opposite side of the sheet, or a combination of these methods. The washing above is performed until the residual solvent content in the sheet is less than 1 wt %. The sheet is then dried, and as for the drying method, the drying may be performed by heat-drying, air-drying or the like.

(f) Step of Heat-Treating Dried Sheet to Obtain Polyolefin Microporous Membrane

The sheet after drying is heat-treated to obtain a polyethylene microporous membrane. The heat treatment is preferably performed at a temperature of 90 to 150° C. from the standpoint of thermal shrinkage and air permeation resistance. The residence time in the heat treatment step is not particularly limited and is usually preferable 1 second or more and 10 minutes or less, more preferably 3 seconds or more and 2 minutes or less. For the heat treatment, any of a tenter method, a roller method, a rolling method, and a free method can be employed.

In the heat treatment step, the sheet is preferably shrunk in at least one direction of the longitudinal direction and the width direction while fixing both the longitudinal direction and the width direction. The residual strain in the polyolefin microporous membrane can be removed by the heat treatment step. From the standpoint of thermal shrinkage rate and air permeation resistance, the shrinkage rate in the longitudinal direction or the width direction in the heat treatment step is preferably 0.01 to 50%, more preferably 3 to 20%. Furthermore, re-heating and re-stretching may be performed for enhancing the mechanical strength. The re-stretching may be either a stretching roller method or a tenter method. A functionalization step such as corona treatment step or hydrophilization step may be provided, if desired, after the steps (a) to (f).

As described above, when the longitudinal stretching and transverse stretching are highly adjusted, the variation range of the F25 value in the longitudinal direction of the polyethylene microporous membrane can be reduced. Consequently, not only the variation range of the coating thickness tends to be reduced in the later-described laminating step of a porous layer but also a battery separator roll with good winding appearance is obtained. Furthermore, the variation range of the F25 value is kept at 1 MPa or less, so that even when the processing is performed at such a high speed as giving a transport rate of more than 50 m/min during winding by means of a rewinder, meandering in the course of transport in a slitting step or coating step can be avoided.

The width of the polyolefin microporous membrane is not particularly limited. However, the lower limit thereof is preferably 500 mm, more preferably 600 mm, and still more preferably 1000 mm. The upper limit thereof is preferably 4000 mm, more preferably 3000 mm, and still more preferably 2000 mm. When the thickness of the polyolefin microporous membrane falls within the range described above, the membrane is suitable for production of a high-capacity battery, and deformation due to its own weight is hard to occur.

For the length of the polyolefin microporous membrane, the lower limit thereof is preferably 1000 m, more preferably 2000 m, and still more preferably 3000 m. The upper limit thereof is not particularly limited. However, it is preferably 10000 m, more preferably 8000 m, and still more preferably 7000 m. When the length of the polyolefin microporous membrane falls within the range described above, productivity is improved, and deformation due to its own weight is hard to occur when formed into a roll.

The thickness of the polyolefin microporous membrane is preferably 5 to 25 μm, from the viewpoint of realizing higher capacity of the battery.

The air permeation resistance of the polyolefin microporous membrane is preferably 50 to 300 sec/$\phi$100 ccAir.

The porosity of the polyolefin microporous membrane is preferably 30 to 70%.

The average pore size of the polyolefin microporous membrane is preferably 0.01 to 1.0 μm, from the viewpoint of pore-blocking performance.

3. Porous Layer

The porous layer is described below.

The porous layer has a function of enhancing the electrode adhesion. The porous layer is constructed mainly from a fluorine-based resin and an inorganic particle. The fluorine-based resin has a role of enhancing the electrode adhesion and binding inorganic particles with each other, or a role of binding the polyolefin microporous membrane and the porous layer. As the fluorine-based resin, it is preferable to use one or more members selected from the group consisting of a vinylidene fluoride homopolymer, a vinylidene fluoride/fluorinated olefin copolymer, a vinyl fluoride homopolymer, and a vinyl fluoride/fluorinated olefin copolymer. The resin may also be a resin graft-polymerized with maleic acid or the like. Such a polymer has excellent adhesion to an electrode, high affinity for a nonaqueous electrolyte, and high chemical and physical stabilities to a nonaqueous electrolyte, and therefore, affinity for an electrolyte can be sufficiently maintained even when used at high temperature. Among them, a polyvinylidene fluoride-hexafluoropropylene copolymer is suitable from the standpoint of electrode adhesion.

The inorganic particle has a role of enhancing the heat resistance or imparting an effect of preventing short-circuit due to a dendrite originating from an electrode material. Examples of the inorganic particle include calcium carbonate, calcium phosphate, amorphous silica, crystalline glass filler, kaolin, talc, titanium dioxide, alumina, silica-alumina composite oxide particle, barium sulfate, calcium fluoride, lithium fluoride, zeolite, molybdenum sulfide, mica, boehmite and the like. In addition, a heat-resistant crosslinked polymer particle may be added, if desired. Examples of the heat-resistant crosslinked polymer particle include a crosslinked polystyrene particle, a crosslinked acrylic resin particle, a crosslinked methyl methacrylate-based particle and the like. Examples of the shape of the particle include a perfectly spherical shape, a substantially spherical shape, a plate shape, a needle shape, and a polyhedral shape but is not particularly limited.

The average particle diameter of the particle is preferably 1.5 times or more and 50 times or less, more preferably 2 times or more and 20 times or less, based on the average pore size of the polyolefin microporous membrane. When the average particle diameter of the particle falls within the preferable range above, in the state of the fluorine-based resin and the particle being mixed, the pore in the laminated polyolefin microporous membrane is prevented from blocking, and as a result, the air permeation resistance can be maintained. In addition, the particle is prevented from falling off in a battery assembly step and causing a serious defect of the battery.

As for the content of the inorganic particle contained in the porous layer, the upper limit is preferably 85 vol %, more preferably 75 vol %, and the lower limit is preferably 30 vol %, more preferably 40 vol %. When the amount of the particle added meets the preferable upper limit above, heat resistance and a dendrite preventing effect are obtained. In addition, when the amount added meets the preferable lower limit above, the ratio of a functional resin to the total volume of the porous layer is optimal and therefore, electrode adhesion is obtained.

4. Method of Laminating Porous Layer on Polyolefin Microporous Membrane

The method of laminating the porous layer on the polyolefin microporous membrane is described.

A predetermined polyolefin porous membrane is coated with a coating solution containing an inorganic particle, a fluorine-based resin, and a solvent capable of dissolving the fluorine-based resin and miscible with water, phase separation is allowed to occur between the fluorine-based resin and the solvent, followed by adding it to a coagulation bath to coagulate the fluorine-based resin, thereby forming the porous layer. In the coating solution, a phase separation aid such as water, ethylene glycol or propylene glycol may be added, if desired.

Examples of the solvents include N,N-dimethylacetamide (DMAc), N-methyl-2-pyrrolidone (NMP), phosphoric hexamethyltriamide (HMPA), N,N-dimethylformamide (DMF), dimethyl sulfoxide (DMSO), γ-butyrolactone, chloroform, tetrachloroethane, dichloroethane, 3-chloronaphthalene, p-chlorophenol, tetralin, acetone, acetonitrile and the like, and can be freely selected depending on the solubility of the resin.

The viscosity of the coating solution is preferably 30 to 200 mPa·s, more preferably 40 to 180 mPa·s, still more preferably 50 to 150 mPa·s. When the viscosity of the coating solution falls within the preferable range above, the thickness of the porous layer can be easily made uniform, and the productivity is excellent. The viscosity of the coating solution may be adjusted by using the solid content concentration of the coating solution or a thickener or may be used by blending a fluorine-based resin differing in the molecular weight.

The solid content concentration of the coating solution is not particularly limited as long as the coating solution can be uniformly applied, and it is preferably 3 wt % or more and 30 wt % or less, more preferably 5 wt % or more and 25 wt % or less. If the solid content concentration is less than 3 wt %, the obtained porous layer may be brittle, and if it exceeds 30 wt %, the productivity and coatability are reduced.

As a method of laminating the porous layer on the polyolefin microporous membrane, for example, a known roll coating method described later can be used. Examples of the roll coating methods include, for example, a reverse roll coating method, a gravure coating method and the like. These methods may be used either alone or in combination. Among them, the gravure coating method is preferred from the viewpoint of a uniform coating thickness.

The thickness of a coating contact line between a roller and the polyolefin microporous membrane in the roll coating method is preferably 3 mm or more and 10 mm or less. When the thickness of the coating contact line exceeds 10 mm, the contact pressure between the polyolefin microporous membrane and the coating roller is large, resulting in that a coating surface is easily scratched.

Figure 5:
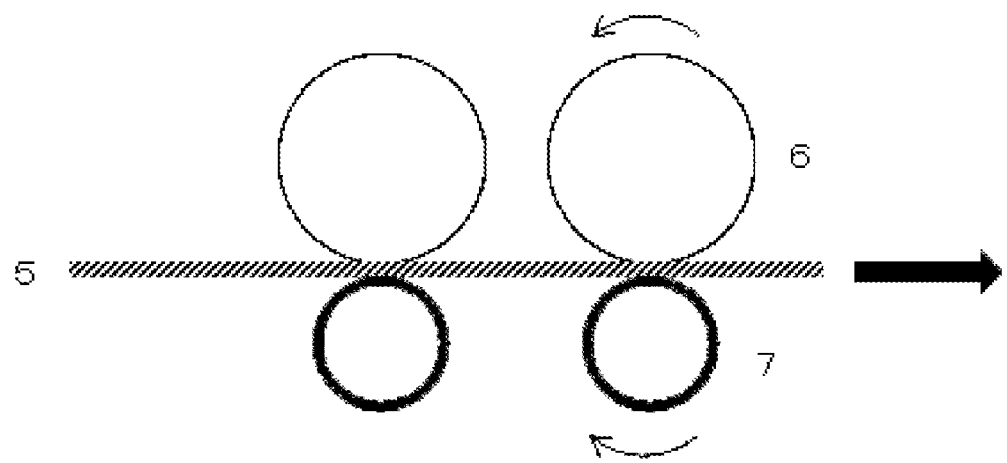
FIG. 5 is a schematic diagram illustrating an example of a longitudinal stretching device used in the re-stretching step.
Figure 6:
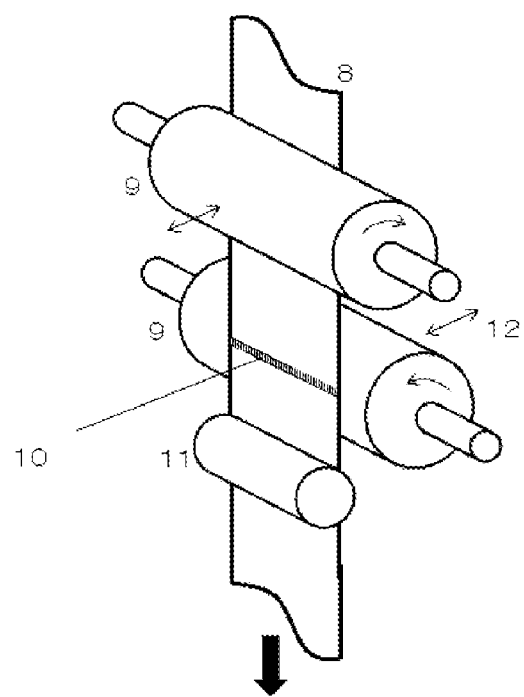
FIG. 6 is a schematic diagram illustrating an example of a coating device.

The coating contact line is a line along which the coating roller contacts with the polyolefin microporous membrane, and the width of the coating contact line means the width of the coating contact line in the longitudinal direction (see FIG. 5). The width of the coating contact line can be measured by observing the coating contact line between the coating roller and the polyolefin microporous membrane from the back side of the polyolefin microporous membrane. The width of the coating contact line can be adjusted by adjusting the left/right position balance relative to the horizontal direction of the backing roller disposed at the back of the coating surface, in addition to positioning the coating roller backward/forward relative to the polyolefin microporous membrane. It is more effective to dispose the backing roller on both the upstream and downstream sides of the coating roller.

The deflection accuracy of the coating roller is preferably 10 μm/φ100 mm or less, more preferably 8 μm/φ100 mm or less, and still more preferably 5 μm/φ100 mm or less. When the deflection accuracy of the coating roller falls within the range described above, the uniform coating thickness is easily obtained also in the longitudinal direction. The higher the deflection accuracy of the coating roller is, the more expensive the cost is. This is important.

From the standpoint of electrode adhesion, the average thickness T(ave) of the porous layer is preferably 1 to 5 μm, more preferably 1 to 4 μm, still more preferably 1 to 3 μm. The winding volume can be reduced, and a battery separator suitable for a lithium ion secondary battery with a high volume energy density is obtained.

The porous layer having a uniform thickness in the width direction of the separator means that the variation range (R) of the thickness to the effective coating width is 1.0 μm or less. The variation range (R) of the thickness is preferably 0.8 or less, and more preferably 0.5 μm or less. The effective coating width as used herein means the width after excluding 3 mm at both edges from the total coating width. This is because the coating solution locally rise or bleeds in 3 mm on both edges by the surface tension of the coating solution.

The porosity of the porous layer is preferably 30 to 90%, more preferably 40 to 70%. The desired porosity is achieved by appropriately adjusting the inorganic particle concentration, binder concentration or the like.

The uniform thickness of the porous layer in the longitudinal direction of the separator means that the variation range (R) of the thickness is 1.0 μm or less to a separator length of 1000 m or more. The variation range (R) of the thickness is preferably 0.8 μm or less, and more preferably 0.5 μm or less.

The solid concentration of the coating solution is not particularly limited as long as the uniform coating can be achieved, but is preferably 20 wt % or more and 80 wt % or less, and more preferably 50 wt % or more and 70 wt % or less. When the solid concentration of the coating solution falls within the preferred range described above, the uniform coating thickness is easily obtained, and the porous layer can be prevented from becoming brittle.

5. Battery Separator

The thickness of the battery separator obtained by laminating the porous layer on the polyolefin microporous membrane is preferably 6 to 30 μm, from the viewpoint of mechanical strength and battery capacity.

The width of the battery separator is not particularly limited. However, the lower limit thereof is preferably 30 mm, more preferably 60 mm, and still more preferably 100 mm. The upper limit thereof is preferably 2000 mm, more preferably 1000 mm, and still more preferably 800 mm. When the thickness of the battery separator falls within the range described above, the separator is suitable for production of a high-capacity battery, and deformation due to its own weight is hard to occur.

For the length of the battery separator, the lower limit thereof is preferably 1000 m, more preferably 2000 m, and still more preferably 3000 m. The upper limit thereof is not particularly limited. However, it is preferably 10000 m, more preferably 8000 m, and still more preferably 7000 m. When the length of the battery separator falls within the range described above, productivity is improved, and deformation due to its own weight is hard to occur when formed into a roll.

It is desirable to store the battery separator in a dry state. However, when storage thereof in an absolute dry state is difficult, it is preferred to perform a reduced-pressure drying treatment at 100° C. or higher just before use.

The battery separator can be used as a separator for a secondary battery such as a nickel-hydrogen battery, a nickel-cadmium battery, a nickel-zinc battery, a silver-zinc battery, a lithium secondary battery or a lithium polymer secondary battery, a plastic film capacitor, a ceramic capacitor, an electric double layer capacitor or the like, and is preferably used as a separator for a lithium ion secondary battery. Description is made below taking as an example the lithium ion secondary battery. The lithium ion secondary battery contains an electrode body in which a cathode and an anode are laminated with the interposition of a separator, and an electrolytic solution (electrolyte). The structure of the electrode body is not particularly limited, and may be a known structure. For example, an electrode structure in which disc-shaped cathode and anode are arranged to face each other (coin type), an electrode structure in which planar cathodes and anodes are alternately laminated (lamination type), an electrode structure in which band-shaped cathode and anode are laminated and wound (winding type) and the like can be employed.

EXAMPLES

Our membranes, separators and methods are specifically described below with reference to examples, but this disclosure is not limited by these examples in any way. The measurements in the examples are values measured by the following methods.

1. Measurement of Variation Range of F25 Value

Five specimens of TD 10 mm×MD 50 mm were cut out at equal intervals in a width direction of each of the polyolefin microporous membranes obtained in the Examples and Comparative Examples. The specimens on both edges were cut out at positions of 30 to 40 mm from the edges in the width direction of the microporous membrane. In accordance with JIS K7113, an SS curve (a relationship between vertical stress (stress) and vertical strain (strain)) in a longitudinal direction of the specimen was determined using a tabletop precision universal tester (Autograph AGS-J, manufactured by Shimadzu Corporation). A vertical stress value was read at 25% elongation of the vertical strain, and the value was divided by a cross-sectional area of each specimen. The value thus obtained was defined as an F25 value, and an average value of 5 measurements in the width direction determined. Each average value of the F25 values in the width direction determined at 5 positions at 250 mm intervals in the longitudinal direction, and the variation range of the F25 value determined from the difference between the maximum value and the minimum value thereof. The polyolefin microporous membrane obtained by peeling and removing the porous layer from the battery separator may be used as the specimen.

Measurement Conditions
Load cell capacity: 1 kN
Clip-to-clip distance: 20 mm
Test speed: 20 mm/min
Measurement environment: temperature 20° C. and relative humidity 60%

2. Variation Range (R) of Thickness of Porous Layer in Longitudinal Direction

Five specimens of TD 10 mm×MD 50 mm were cut out at equal intervals in a width direction of each of the polyolefin microporous membranes obtained in Examples and Comparative Examples. The specimens on both edges were cut out at positions of 30 to 40 mm from the edges in the width direction of the microporous membrane.

The thickness of the porous layer was determined by SEM observation of a cross-section of each specimen. A cross-section specimen was prepared by using a cryo-CP method and to prevent charge-up of the electron beam, metal microparticles were slightly deposited on the specimen, and the SEM observation performed. Assuming an inorganic particle existence region as the porous layer, the thickness thereof was measured, and an average value of 5 measurements in the width direction determined. Each average value in the width direction was determined at 5 positions at 250 mm intervals in a longitudinal direction, and the difference between the maximum value and the minimum value thereof defined as the variation range (R) of the thickness of the porous layer in the longitudinal direction. When the porous layers was placed on both surfaces of the polyolefin microporous membrane, the variation range (R) of the thickness of the porous layer in the longitudinal direction was similarly determined for every one surface, and the larger value thereof defined as the variation range (R) of that sample. An average value of the above-mentioned 25 measurements in total for the thickness of the specimen defined as the average thickness T (ave).

Measurement Instrument
Field emission scanning electron microscope (FE-SEM) S-4800, manufactured by Hitachi High-Technologies Corporation
Cross-section polisher (CP) SM-9010, manufactured by JEOL Ltd.
Measurement Conditions
Acceleration voltage: 1.0 kV 3. Variation Range of Surface Temperature of Longitudinal Stretching Roller A surface temperature of each roller was measured 5 times for each 5 minutes by an infrared radiation thermometer, and the variation range of the surface temperature of a longitudinal stretching roller determined from the difference between the maximum value and the minimum value.

4. Measurement of Thickness of Coating Contact Line

A coating contact line is a line in a width direction, at which a coating roller and the polyolefin microporous membrane are brought into contact with each other during coating. The thickness of the coating contact line is the width in a longitudinal direction of the coating contact line, and means a value which is read using a scale through a rear surface of the polyolefin microporous membrane.

5. Winding Appearance

Rolls of the battery separators obtained in Examples and Comparative Examples were visually observed, and the number of portions where deformation or winding displacement occurred was counted.
Evaluation Criteria
A (good): none
B (acceptable): 1 to 3 portions
C (poor): 4 or more portions 6. Evaluation of Scratch From each of rolls of the battery separators obtained in Examples and Comparative Examples, an outermost portion was removed and, thereafter, 1 $m^2$ of an inner peripheral portion pulled out to prepare a sample for evaluation. For scratch detection, Brome Light (lighting equipment used for photographic shooting or video recording) was used to light on a coating surface, and scratches visually observed. Then, the number of the scratches was counted.
Evaluation Criteria
A (good): 1 or less
B (acceptable): from 2 to 5
C (poor): 6 or more Example 1

With 100 parts by mass of a composition composed of 40 mass % of an ultrahigh molecular weight polyethylene having a mass average molecular weight of $2.5 \times 10^6$ and 60 mass % of a high-density polyethylene having a mass average molecular weight of $2.8 \times 10^5$, 0.375 parts by mass of tetrakis[methylene-3-(3,5-ditertiary-butyl-4-hydroxyphenyl)propionate]methane was dry-blended to prepare a polyethylene composition. Thirty parts by weight of the polyethylene composition obtained was introduced into a biaxial extruder. Furthermore, 70 parts by weight of liquid paraffin was supplied through a side-feeder of the biaxial extruder, and melt-kneaded to prepare a polyethylene resin solution in the extruder. Subsequently, the polyethylene resin solution was extruded through a die disposed at an end of the extruder at 190° C., and an unstretched gel-like sheet formed while taking it up around a cooling roller in which an internal cooling water temperature was kept at 25° C. The unstretched gel-like sheet obtained was allowed to pass through 4 pre-heat roller groups so that the temperature of a sheet surface became 110° C., and introduced to a longitudinal stretching device A shown in FIG. 1. Then, the unstretched gel-like sheet was allowed to pass through longitudinal stretching rollers.

In the longitudinal stretching device A, a metal roller (surface roughness: 0.5 S) plated with hard chromium, with a width of 1000 mm and a diameter of 300 mm, was used as the longitudinal stretching roller. The surface temperature of each longitudinal stretching roller was 110° C., and the variation range of the surface temperature controlled to within ±2° C. A polyester-made doctor blade was used as a doctor blade. A nitrile rubber-coated roller (manufacture by Katsura Roller Mfg. Co., Ltd.) was used as a nip roller, and the pressure of each nip roller was 0.3 MPa. The peripheral speed of the longitudinal stretching rollers was increased stepwise in a conveying direction. The peripheral speed ratio of the first longitudinal stretching roller and the second longitudinal stretching roller was set to 1.3, the peripheral speed ratio of the second longitudinal stretching roller and the third longitudinal stretching roller was set to 1.5, the peripheral speed ratio of the third longitudinal stretching roller and the fourth longitudinal stretching roller was set to 1.8, and the peripheral speed ratio of the fourth longitudinal stretching roller and the fifth longitudinal stretching roller was set to 2.1. For the interval between the longitudinal stretching rollers adjacent to each other, the distance from departure of the gel-like sheet during stretching from the stretching roller to contact thereof with the next stretching roller was 200 mm. Then, the sheet was allowed to pass through 4 cooling rollers so that the sheet temperature became 50° C. to form a longitudinally stretched gel-like sheet. Both edges of the longitudinally stretched gel-like sheet obtained were held by clips, and the sheet stretched at a stretch ratio of 6 times in a transverse direction at a temperature of 115° C. in a tenter divided into 20 zones to form a biaxially stretched gel-like sheet. At this time, the clip-to-clip distance in a sheet advancing direction was 5 mm from an inlet of the tenter to an outlet thereof. The biaxially stretched gel-like sheet obtained was cooled to 30° C., and liquid paraffin removed in a methylene chloride washing tank temperature-controlled to 25° C., followed by drying in a drying furnace adjusted to 60° C.

The resulting sheet after drying was re-stretched at a stretch ratio of 1.2 times by a re-stretching device shown in FIG. 5, and heat-treated at 125° C. for 20 seconds to obtain a polyolefin microporous membrane having a thickness of 7 μm. Further, a polyolefin microporous membrane roll having a width of 4000 mm and a winding length of 5050 m was obtained at a transport rate of 50 m/min during winding. This was slit to a width of 950 mm to obtain a coating substrate.

Preparation of Coating Solution

A mixture of polyvinylidene fluoride-hexafluoropropylene copolymer (VdF/HFP=92/8 (weight ratio), weight average molecular weight: 1,000,000) and a polyvinylidene fluoride-hexafluoropropylene copolymer (VdF/HFP=88/12 (weight ratio), weight average molecular weight: 600,000), which were blended so that the solution viscosity of a coating solution was adjusted to 100 mPa·s, was used as a fluorine-based resin.

The fluorine-based resin, alumina particles (average particle size: 0.5 μm) and N-methyl-2-pyrrolidone were mixed. The alumina particles were blended to be 50% by volume based on the total volume of the fluorine-based resin and the alumina particles and have a solid concentration of 10 wt %. After the fluorine-based resin was completely dissolved and the alumina particles uniformly dispersed, filtration was performed through a filter having a filtration limit of 5 μm to prepare a coating solution a.

Using a coating device (a reverse gravure coating method) shown in FIG. 5, both surfaces of the coating substrate were coated with the same amount of the coating solution under conditions of a transport rate of 50 m/min, and the substrate immersed and coagulated in a coagulation bath composed of an aqueous solution containing 5 wt % of N-methyl-2-pyrrolidone, followed by washing with water and drying to obtain a battery separator. At this time, the positions of a gravure roller and a backing roller were adjusted so that the thickness of a coating contact line was 3 to 5 mm. In addition, as the coating roller, the gravure roller having a diameter of 100 mm and an deflection accuracy of 8 μm/ϕ100 mm was used. Then, the battery separator was slit to an effective coating width to obtain a battery separator roll having a width of 900 mm and a winding length of 5000 m.

The basis weight of the porous layer during drying was 5.0 g/m² in total on both surfaces.

Example 2

Figure 2:
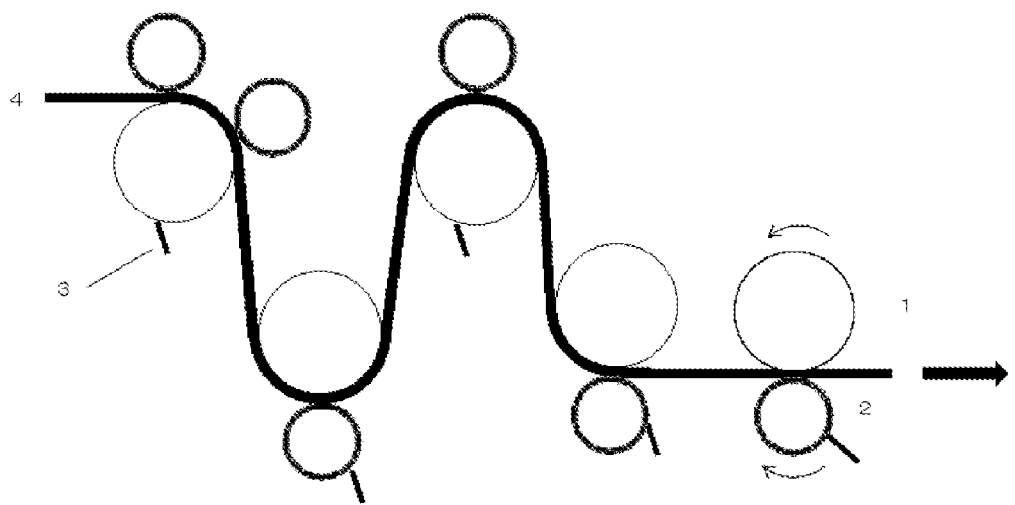
FIG. 2 is a schematic diagram illustrating a longitudinal stretching device B used for sequential biaxial stretching.

A battery separator was obtained in the same manner as in Example 1, except that a longitudinal stretching device B shown in FIG. 2 was used in place of the longitudinal stretching device A.

Example 3

Figure 3:
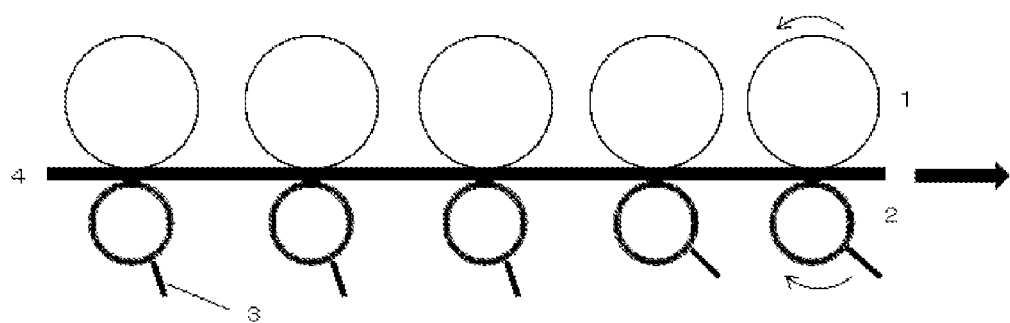
FIG. 3 is a schematic diagram illustrating a longitudinal stretching device C used for sequential biaxial stretching.

A battery separator was obtained in the same manner as in Example 1, except that a longitudinal stretching device C shown in FIG. 3 was used in place of the longitudinal stretching device A.

Example 4

Figure 4:
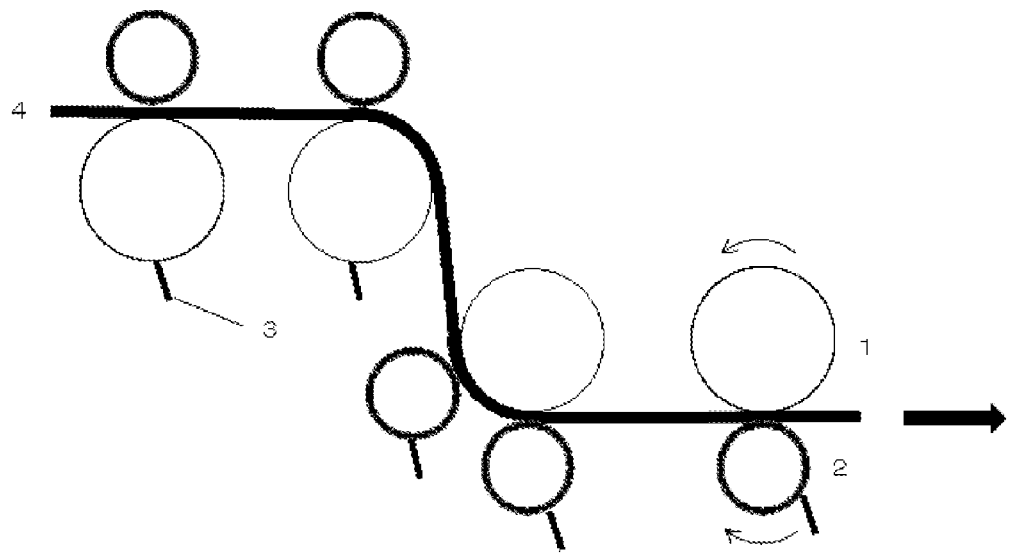
FIG. 4 is a schematic diagram illustrating a longitudinal stretching device D used for sequential biaxial stretching.

A battery separator was obtained in the same manner as in Example 1, except that a longitudinal stretching device D shown in FIG. 4 was used in place of the longitudinal stretching device A, and that the peripheral speed ratio of the first longitudinal stretching roller and the second longitudinal stretching roller was set to 1.5, the peripheral speed ratio of the second longitudinal stretching roller and the third longitudinal stretching roller was set to 2.0, and the peripheral speed ratio of the third longitudinal stretching roller and the fourth longitudinal stretching roller was set to 2.5, in the longitudinal stretching device D.

Example 5

A battery separator was obtained in the same manner as in Example 1, except that the pressure of each nip roller was changed to 0.1 MPa in the longitudinal stretching device A.

Example 6

A battery separator was obtained in the same manner as in Example 1, except that the pressure of each nip roller was changed to 0.5 MPa in the longitudinal stretching device A.

Example 7

A battery separator was obtained in the same manner as in Example 1, except that ceramic-coated metal rollers having a surface roughness of 5.0 S were used for all the five longitudinal stretching rollers in the longitudinal stretching device A.

Example 8

A battery separator was obtained in the same manner as in Example 1, except that the peripheral speed ratio of the first longitudinal stretching roller and the second longitudinal stretching roller was set to 1.2, the peripheral speed ratio of the second longitudinal stretching roller and the third longitudinal stretching roller was set to 1.5, the peripheral speed ratio of the third longitudinal stretching roller and the fourth longitudinal stretching roller was set to 1.8, and the peripheral speed ratio of the fourth longitudinal stretching roller and the fifth longitudinal stretching roller was set to 2.3, in the longitudinal stretching device A.

Example 9

A battery separator was obtained in the same manner as in Example 1, except that the peripheral speed ratio of the first longitudinal stretching roller and the second longitudinal stretching roller was set to 1.3, the peripheral speed ratio of the second longitudinal stretching roller and the third longitudinal stretching roller was set to 1.7, the peripheral speed ratio of the third longitudinal stretching roller and the fourth longitudinal stretching roller was set to 1.8, and the peripheral speed ratio of the fourth longitudinal stretching roller and the fifth longitudinal stretching roller was set to 1.9, in the longitudinal stretching device A.

Example 10

A battery separator was obtained in the same manner as in Example 1, except that a coating solution b was used, and in the coating solution b, the solution viscosity of the coating solution was adjusted to 70 mPa·s by adjusting the blending ratio of the respective polyvinylidene fluoride-hexafluoroprolylene copolymers in preparation of the coating solution.

Example 11

A battery separator was obtained in the same manner as in Example 1, except that a coating solution c was used, and in the coating solution c, the solution viscosity of the coating solution was adjusted to 180 mPa·s by adjusting the blending ratio of the respective polyvinylidene fluoride-hexafluoroprolylene copolymers in preparation of the coating solution.

Example 12

A battery separator was obtained in the same manner as in Example 1, except that a gravure roller having a deflection accuracy of 10 μm/φ100 mm was used.

Example 13

A battery separator was obtained in the same manner as in Example 1, except that a gravure roller having a deflection accuracy of 5 μm/$100 mm was used.

Example 14

A battery separator was obtained in the same manner as in Example 1, except that the thickness of the coating contact line was within a range of 5 to 7 mm by adjusting the positions of the gravure roller and the backing roller in the coating device.

Example 15

A battery separator was obtained in the same manner as in Example 1, except that the thickness of a coating contact line was within a range of 8 to 10 mm by adjusting the positions of the gravure roller and the backing roller in the coating device.

Comparative Example 1

Both edges of the unstretched gel-like sheet formed in Example 1 were held by clips. The unstretched gel-like sheet was introduced into a tenter controlled to a temperature of 116° C. and divided into 5 zones, and stretched at a ratio of 7 times in a longitudinal direction and at a ratio of 7 times in a transverse direction by a simultaneous biaxial stretching method to form a simultaneously biaxially stretched gel-like sheet. At this time, the clip-to-clip distance was 5 mm at an inlet of the tenter in a transporting direction, and 95 mm at an outlet of the tenter. Then, the simultaneously biaxially stretched gel-like sheet was cooled to 30° C., and washed in a methylene chloride washing tank in which temperature was controlled to 25° C. to remove liquid paraffin. The sheet was dried in a drying furnace adjusted to 60° C. to obtain a polyolefin microporous membrane. Further, a polyolefin microporous membrane roll having a width of 4000 mm and a winding length of 5050 m was obtained at a transport rate of 50 m/min during winding. This was slit to a width of 950 mm to obtain a coating substrate. A battery separator was obtained in the same manner as in Example 1, except that the polyolefin microporous membrane obtained was used.

Comparative Example 2

A battery separator was obtained in the same manner as in Example 1, except that no nip roller was used on each of the 5 longitudinal stretching rollers in the longitudinal stretching device A.

Comparative Example 3

A battery separator was obtained in the same manner as in Example 1, except that no nip roller was used on each of the 5 longitudinal stretching rollers, using the longitudinal stretching device B.

Comparative Example 4

A battery separator was obtained in the same manner as in Example 1, except that the pressure of each nip roller was 0.04 MPa in the longitudinal stretching device A.

Comparative Example 5

A battery separator was obtained in the same manner as in Example 1, except that a metal roller plated with hard chromium and having a surface roughness of 0.1 S was used as the longitudinal stretching roller in the longitudinal stretching device A.

Comparative Example 6

A battery separator was obtained in the same manner as in Example 1, except that the peripheral speed ratio of the first longitudinal stretching roller and the second longitudinal stretching roller was set to 1.6, the peripheral speed ratio of the second longitudinal stretching roller and the third longitudinal stretching roller was set to 1.6, the peripheral speed ratio of the third longitudinal stretching roller and the fourth longitudinal stretching roller was set to 1.7, and the peripheral speed ratio of the fourth longitudinal stretching roller and the fifth longitudinal stretching roller was set to 1.7, in the longitudinal stretching device A.

Comparative Example 7

A battery separator was obtained in the same manner as in Example 1, except that the peripheral speed ratio of the first longitudinal stretching roller and the second longitudinal stretching roller was set to 1.1, the peripheral speed ratio of the second longitudinal stretching roller and the third longitudinal stretching roller was set to 1.3, the peripheral speed ratio of the third longitudinal stretching roller and the fourth longitudinal stretching roller was set to 1.5, and the peripheral speed ratio of the fourth longitudinal stretching roller and the fifth longitudinal stretching roller was set to 3.5, in the longitudinal stretching device A in the production of the polyolefin microporous membrane.

Comparative Example 8

A battery separator was obtained in the same manner as in Example 1, except that the peripheral speed ratio of the first longitudinal stretching roller and the second longitudinal stretching roller was set to 1.3, the peripheral speed ratio of the second longitudinal stretching roller and the third longitudinal stretching roller was set to 1.7, the peripheral speed ratio of the third longitudinal stretching roller and the fourth longitudinal stretching roller was set to 1.8, and the peripheral speed ratio of the fourth longitudinal stretching roller and the fifth longitudinal stretching roller was set to 1.9, in the longitudinal stretching device A in the production of the polyolefin microporous membrane.

Comparative Example 9

A battery separator was obtained in the same manner as in Example 1, except that the temperature variation range of each longitudinal stretching roller was within ±3° C. in the longitudinal stretching device A.

Comparative Example 10

A battery separator was obtained in the same manner as in Example 1, except that a coating solution e was used, and in the coating solution e, the solution viscosity of the coating solution was adjusted to 650 mPa·s by adjusting the blending ratio of the respective polyvinylidene fluoride-hexafluoropropylene copolymers in preparation of the coating solution.

Comparative Example 11

In the production of the polyolefin microporous membrane, the extrusion amount of the polyethylene resin solution was adjusted to obtain a polyethylene microporous membrane having the same thickness as that of the battery separator in Example 1 as a battery separator.

Comparative Example 12

A battery separator was obtained in the same manner as in Example 1, except that a gravure roller having a deflection accuracy of 12 μm/ϕ100 mm was used.

Comparative Example 13

A battery separator was obtained in the same manner as in Example 1, except that the thickness of the coating contact line was within a range of 11 to 13 mm by adjusting the positions of the gravure roller and the backing roller of the coating device.

The production conditions of the polyolefin microporous membranes obtained in Examples 1 to 15 and Comparative Examples 1 to 13 and the properties thereof are shown in Table 1. The production conditions of the battery separators, the properties thereof and the properties of the rolls are shown in Table 2.

TABLE 1

| | | Production conditions of polyolefin microporous membrane | | | | | | Polyolefin microporous membrane Variation range of F25 value (MPa) |
|---|---|---|---|---|---|---|---|---|
| | Stretching method | Longitudinal stretching device | Surface roughness of longitudinal stretching roller (S) | Nip pressure (MPa) | Variation range of surface temperature of longitudinal stretching roller | Speed ratio of longitudinal stretching rollers | Clip-to-clip distance at tenter outlet (mm) | |
| Example 1 | Sequential-biaxial | A | 0.5 | 0.3 | Within ±2° C. | 1.3/1.5/1.8/2.1 | 5 | 0.7 |
| Example 2 | Sequential-biaxial | B | 0.5 | 0.3 | Within ±2° C. | 1.3/1.5/1.8/2.1 | 5 | 0.6 |
| Example 3 | Sequential-biaxial | C | 0.5 | 0.3 | Within ±2° C. | 1.3/1.5/1.8/2.1 | 5 | 0.8 |
| Example 4 | Sequential-biaxial | D | 0.5 | 0.3 | Within ±2° C. | 1.5/2.0/2.5 | 5 | 0.8 |
| Example 5 | Sequential-biaxial | A | 0.5 | 0.1 | Within ±2° C. | 1.3/1.5/1.8/2.1 | 5 | 1.0 |
| Example 6 | Sequential-biaxial | A | 0.5 | 0.5 | Within ±2° C. | 1.3/1.5/1.8/2.1 | 5 | 0.5 |
| Example 7 | Sequential-biaxial | A | 5.0 | 0.3 | Within ±2° C. | 1.3/1.5/1.8/2.1 | 5 | 0.5 |
| Example 8 | Sequential-biaxial | A | 0.5 | 0.3 | Within ±2° C. | 1.2/1.5/1.8/2.3 | 5 | 0.5 |
| Example 9 | Sequential-biaxial | A | 0.5 | 0.3 | Within ±2° C. | 1.3/1.7/1.8/1.9 | 5 | 0.8 |
| Example 10 | Sequential-biaxial | A | 0.5 | 0.3 | Within ±2° C. | 1.3/1.5/1.8/2.1 | 5 | 0.7 |
| Example 11 | Sequential-biaxial | A | 0.5 | 0.3 | Within ±2° C. | 1.3/1.5/1.8/2.1 | 5 | 0.7 |
| Example 12 | Sequential-biaxial | A | 0.5 | 0.3 | Within ±2° C. | 1.3/1.5/1.8/2.1 | 5 | 0.7 |
| Example 13 | Sequential-biaxial | A | 0.5 | 0.3 | Within ±2° C. | 1.3/1.5/1.8/2.1 | 5 | 0.7 |
| Example 14 | Sequential-biaxial | A | 0.5 | 0.3 | Within ±2° C. | 1.3/1.5/1.8/2.1 | 5 | 0.7 |
| Example 15 | Sequential-biaxial | A | 0.5 | 0.3 | Within ±2° C. | 1.3/1.5/1.8/2.1 | 5 | 0.7 |
| Comparative Example 1 | Simultaneous-biaxial | — | — | — | — | — | 95 | 3.5 |
| Comparative Example 2 | Sequential-biaxial | A | 0.5 | — | Within ±2° C. | 1.3/1.5/1.8/2.1 | 5 | 2 |
| Comparative Example 3 | Sequential-biaxial | B | 0.5 | — | Within ±2° C. | 1.3/1.5/1.8/2.1 | 5 | 1.8 |
| Comparative Example 4 | Sequential-biaxial | A | 0.5 | 0.04 | Within ±2° C. | 1.3/1.5/1.8/2.1 | 5 | 1.6 |
| Comparative Example 5 | Sequential-biaxial | A | 0.1 | 0.3 | Within ±2° C. | 1.3/1.5/1.8/2.1 | 5 | 1.3 |
| Comparative Example 6 | Sequential-biaxial | A | 0.5 | 0.3 | Within ±2° C. | 1.6/1.6/1.7/1.7 | 5 | 1.7 |
| Comparative Example 7 | Sequential-biaxial | A | 0.5 | 0.3 | Within ±2° C. | 1.1/1.3/1.5/3.5 | 5 | 1.5 |
| Comparative Example 8 | Sequential-biaxial | A | 0.5 | 0.3 | Within ±2° C. | 1.3/1.7/1.8/1.9 | 5 | 2.3 |
| Comparative Example 9 | Sequential-biaxial | A | 0.5 | 0.3 | Within ±3° C. | 1.3/1.5/1.8/2.1 | 5 | 1.4 |

TABLE 1-continued

| | Production conditions of polyolefin microporous membrane | | | | | | | Polyolefin microporous membrane Variation range of F25 value (MPa) |
|---|---|---|---|---|---|---|---|---|
| | Stretching method | Longitudinal stretching device | Surface roughness of longitudinal stretching roller (S) | Nip pressure (MPa) | Variation range of surface temperature of longitudinal stretching roller | Speed ratio of longitudinal stretching rollers | Clip-to-clip distance at tenter outlet (mm) | |
| Comparative Example 10 | Sequential-biaxial | A | 0.5 | 0.3 | Within ±2° C. | 1.3/1.5/1.8/2.1 | 5 | 0.7 |
| Comparative Example 11 | Sequential-biaxial | A | 0.5 | 0.3 | Within ±2° C. | 1.3/1.5/1.8/2.1 | 5 | 0.7 |
| Comparative Example 12 | Sequential-biaxial | A | 0.5 | 0.3 | Within ±2° C. | 1.3/1.5/1.8/2.1 | 5 | 0.7 |
| Comparative Example 13 | Sequential-biaxial | A | 0.5 | 0.3 | Within ±2° C. | 1.3/1.5/1.8/2.1 | 5 | 0.7 |

TABLE 2

| | Coating conditions | | | Battery separator | | | |
|---|---|---|---|---|---|---|---|
| | Coating solution | Deflection accuracy of coating roller (μm/φ100 mm) | Thickness of coating contact line (mm) | Thickness variation range of porous layer in longitudinal direction (μm) | High density winding property | Winding appearance | Scratches |
| Example 1 | a | 8 | 3 to 5 | 0.5 | 107 | A | A |
| Example 2 | a | 8 | 3 to 5 | 0.4 | 108 | A | A |
| Example 3 | a | 8 | 3 to 5 | 0.6 | 106 | A | A |
| Example 4 | a | 8 | 3 to 5 | 0.6 | 106 | A | A |
| Example 5 | a | 8 | 3 to 5 | 0.7 | 105 | A | A |
| Example 6 | a | 8 | 3 to 5 | 0.4 | 104 | A | A |
| Example 7 | a | 8 | 3 to 5 | 0.4 | 108 | A | A |
| Example 8 | a | 8 | 3 to 5 | 0.4 | 108 | A | A |
| Example 9 | a | 8 | 3 to 5 | 0.6 | 106 | A | A |
| Example 10 | b | 8 | 3 to 5 | 0.5 | 109 | A | A |
| Example 11 | c | 8 | 3 to 5 | 0.5 | 104 | A | A |
| Example 12 | a | 10 | 3 to 5 | 0.7 | 106 | A | A |
| Example 13 | a | 5 | 3 to 5 | 0.3 | 109 | A | A |
| Example 14 | a | 8 | 5 to 7 | 0.5 | 107 | A | A |
| Example 15 | a | 8 | 8 to 10 | 0.5 | 107 | A | A |
| Comparative Example 1 | a | 8 | 3 to 5 | 2.4 | 100 | B | A |
| Comparative Example 2 | a | 8 | 3 to 5 | 1.8 | 101 | B | A |
| Comparative Example 3 | a | 8 | 3 to 5 | 1.7 | 101 | B | A |
| Comparative Example 4 | a | 8 | 3 to 5 | 1.6 | 102 | B | A |
| Comparative Example 5 | a | 8 | 3 to 5 | 1.3 | 102 | B | A |
| Comparative Example 6 | a | 8 | 3 to 5 | 1.7 | 101 | B | A |
| Comparative Example 7 | a | 8 | 3 to 5 | 1.5 | 102 | B | A |
| Comparative Example 8 | a | 8 | 3 to 5 | 2.1 | 100 | B | A |
| Comparative Example 9 | a | 8 | 3 to 5 | 1.6 | 101 | B | A |
| Comparative Example 10 | d | 8 | 3 to 5 | 0.5 | 96 | A | A |
| Comparative Example 11 | — | 8 | — | — | 109 | A | A |
| Comparative Example 12 | a | 12 | 3 to 5 | 1.1 | 101 | A | A |
| Comparative Example 13 | a | 8 | 11 to 13 | 0.5 | 0.7 | A | C |

The invention claimed is:

1. A battery separator comprising a polyolefin microporous membrane and a porous layer placed on at least one surface of the polyolefin microporous membrane, wherein the polyolefin microporous membrane has a variation range of an F25 value in a longitudinal direction of 1 MPa or less, wherein the F25 value indicates a value obtained by dividing a load value measured at 25% elongation of a specimen using a tensile tester in accordance with JIS K 7113 with a cross-sectional area of the specimen, the measurement conditions being a load cell capacity of 1 kN, a clip-to-clip distance of 20 mm, a test speed of 20 mm/min, and a measurement environment of temperature 20° C. and relative humidity 60%, and the porous layer contains a fluorine-based resin and an inorganic particle and has an average thickness T(ave) of 1 to 5 µm.

2. The battery separator according to claim 1, wherein the porous layer has a thickness variation range (R) in a longitudinal direction of 1.0 µm or less.

3. The battery separator according to claim 1, wherein the fluorine-based resin contains at least one member selected from a polyvinylidene fluoride and a polyvinylidene fluoride-hexafluoropropylene copolymer.

4. The battery separator according to claim 1, wherein a length of the polyolefin microporous membrane is 2000 m or more.

5. The battery separator according to claim 1, wherein a length of the polyolefin microporous membrane is 3000 m or more.

6. A method of producing a battery separator, comprising:
(a) a step of melt-kneading a polyolefin resin and a forming solvent, thereby preparing a polyolefin resin solution;
(b) a step of extruding the polyolefin resin solution in a sheet shape from an extruder and cooling an extrudate thereof, thereby forming an unstretched gel-like sheet;
(c) a step of passing the unstretched gel-like sheet between at least three pairs of longitudinal stretching roller groups and stretching the sheet in a longitudinal direction with a stepwise increase of peripheral speeds of the roller groups, thereby forming a longitudinally stretched gel-like sheet, wherein a longitudinal stretching roller and a nip roller that has been covered with a heat resistant rubber and parallelly contacts therewith are designated as a pair of longitudinal stretching roller group, and a contact pressure of the nip roller to the longitudinal stretching roller is 0.05 MPa or more and 0.5 MPa or less;
(d) a step of stretching the longitudinally stretched gel-like sheet in a transverse direction while holding to allow a clip-to-clip distance to be 50 mm or less at a tenter outlet, thereby obtaining a biaxially stretched gel-like sheet;
(e) a step of extracting the forming solvent from the biaxially stretched gel-like sheet and drying it;
(f) a step of heat-treating the dried sheet, thereby obtaining a polyolefin microporous membrane; and
(g) a step of coating at least one surface of the polyolefin microporous membrane with a coating solution containing a fluorine-based resin and an inorganic particle by a roll coating method using a coating roller having a deflection accuracy of 10 µm/φ100 mm or less, followed by drying.

7. The method according to claim 6, wherein a peripheral speed ratio of the longitudinal stretching rollers adjacent to each other in the step (c) increases stepwise.

8. The method according to claim 6, wherein the coating roller is a gravure roller.

9. A method of producing a battery separator roll, the method comprising a step of winding the battery separator according to claim 1 on a winding core at a transport rate of 50 m/min or more.

10. A method of producing a battery separator roll, comprising a step of winding a battery separator obtained by the method according to claim 6 on a winding core at a transport rate of 50 m/min or more.

* * * * *